(12) United States Patent
Haimer (10) Patent No.: US 9,061,356 B2
(45) Date of Patent: Jun. 23, 2015

(54) DAMPING SLEEVE

(75) Inventor: Franz Haimer, Hollenbach/Igenhausen (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 1107 days.

(21) Appl. No.: 13/061,306

(22) PCT Filed: Aug. 11, 2009

(86) PCT No.: PCT/EP2009/005832
§ 371 (c)(1),
(2), (4) Date: May 13, 2011

(87) PCT Pub. No.: WO2010/022859
PCT Pub. Date: Mar. 4, 2010

(65) Prior Publication Data
US 2011/0266756 A1    Nov. 3, 2011

(30) Foreign Application Priority Data

Aug. 29, 2008  (DE) .......................... 10 2008 044 813
Dec. 3, 2008   (DE) .......................... 10 2008 060 374

(51) Int. Cl.
*B23B 31/117*     (2006.01)

(52) U.S. Cl.
CPC ....... *B23B 31/1177* (2013.01); *Y10T 279/3462* (2015.01); *Y10T 279/17965* (2015.01); *Y10T 279/17111* (2015.01); *Y10T 409/304312* (2015.01); *Y10T 408/76* (2015.01); *B23B 31/1179* (2013.01); *B23B 2231/201* (2013.01); *B23B 2231/2027* (2013.01)

(58) Field of Classification Search
CPC ............ B23B 31/1177; B23B 31/1179; B23B 2231/201; B23B 2231/2018; B23B 2231/2027; B23B 2231/204; B23B 2231/2043; B23B 2250/16
USPC ................ 279/20, 102, 103, 43.1, 43.2, 46.2, 279/46.3; 408/143; 409/141
See application file for complete search history.

(56) References Cited

U.S. PATENT DOCUMENTS

| 2,487,723 | A | * | 11/1949 | Nordstrom | ................... | 279/2.15 |
| 2,889,811 | A | * | 6/1959 | Guillemier | ................... | 173/210 |
| 3,630,534 | A | | 12/1971 | Better | | |
| 4,500,234 | A | | 2/1985 | Orth et al. | | |

(Continued)

FOREIGN PATENT DOCUMENTS

| DE | 3517246 A1 | 1/1986 |
| DE | 4326023 A1 | 3/1994 |

(Continued)

OTHER PUBLICATIONS

"Collets with 8° setting angle for tool shanks—Collets, nuts and fitting dimensions", International Standard ISO 15488, Second Edition, 2003-11-15, 16 pages, Reference No. ISO 15488:2003(E), Switzerland.

*Primary Examiner* — Eric A Gates (57) ABSTRACT

The invention relates to a tool holder comprising a tool receptacle for frictionally clamping a tool shaft. A sleeve is arranged between the tool shaft and the clamping surface of the tool holder, said tool holder applying pressure to the tool shaft via the sleeve, producing the friction fit. At least one of the bearing surfaces of the sleeve is interrupted by open surfaces that are designed and arranged such that they form the damping cavities.

17 Claims, 10 Drawing Sheets

(56) References Cited

U.S. PATENT DOCUMENTS

| | | | |
|---|---|---|---|
| 4,630,980 A * | 12/1986 | Kubo | 409/234 |
| 4,721,423 A * | 1/1988 | Kubo | 409/234 |
| 4,947,907 A * | 8/1990 | Anselm | 144/224 |
| 5,311,654 A * | 5/1994 | Cook | 29/447 |
| 5,324,050 A | 6/1994 | Kanaan | |
| 5,593,258 A * | 1/1997 | Matsumoto et al. | 409/234 |
| 6,280,126 B1 | 8/2001 | Slocum et al. | |
| 6,537,000 B1 * | 3/2003 | Weck | 409/141 |
| 6,854,367 B2 * | 2/2005 | Ericksson et al. | 82/138 |
| 6,938,903 B1 * | 9/2005 | Haimer | 279/4.03 |
| 7,066,693 B2 * | 6/2006 | Baxivanelis et al. | 408/143 |
| 7,182,558 B2 * | 2/2007 | Haimer | 409/234 |
| 7,217,072 B1 * | 5/2007 | Haimer | 409/234 |
| 7,367,763 B2 * | 5/2008 | Ruy Frota de Souza | 409/234 |
| 7,699,321 B2 * | 4/2010 | Weller et al. | 279/43.7 |
| 7,938,408 B2 * | 5/2011 | Haimer | 279/102 |
| 8,118,311 B2 * | 2/2012 | Retzbach et al. | 279/43.1 |
| 8,439,369 B2 * | 5/2013 | Haimer | 279/102 |
| 2002/0020243 A1 * | 2/2002 | Ziegert | 74/490 |
| 2007/0246899 A1 * | 10/2007 | Haimer | 279/9.1 |

FOREIGN PATENT DOCUMENTS

| | | |
|---|---|---|
| DE | 10048772 C1 | 5/2002 |
| DE | 19926209 | 9/2003 |
| DE | 102007007890 A1 | 8/2008 |
| EP | 0611624 A1 | 8/1994 |
| EP | 1291103 A1 | 3/2003 |
| EP | 1353768 B1 | 10/2003 |
| WO | 02051571 A1 | 7/2002 |
| WO | 2005120751 A2 | 12/2005 |

* cited by examiner

Section AA

Fig. 6

Section BB

DAMPING SLEEVE

FIELD OF THE INVENTION

The invention relates to a tool holder for a tool that can be rotated around a rotation axis, particularly in the form of a drill, a milling tool, or a reaming tool.

BACKGROUND OF THE INVENTION

It is known to secure the shank of such a tool by means of a press fit in a central receiving opening of an annular, intrinsically closed tool holder part usually embodied in the form of a sleeve part. This sleeve part constitutes the tool end of a tool holder of an otherwise conventional design.

The above-mentioned part or sleeve part of the tool holder can be expanded with heat in the radial direction until the cold shank of the tool can be inserted into or removed from the sleeve part. As soon as the sleeve part has cooled again, a press-fit connection is established between it and the shank of the tool, thus reliably securing the tool in the tool holder (shrink-fit technology, for example see EP 1 353 768 B1).

Alternatively, hydraulic clamping is also possible. For this purpose, a hydraulic clamping mechanism is situated inside the above-mentioned part of the tool holder and when acted on with hydraulic pressure, reduces its inner diameter encompassing the tool shank, thus clamping the tool shank in a frictional fashion.

As a third alternative, it is possible for the pressure required for secure frictional clamping of the tool shank to be exerted by purely mechanical means, for example by means of collet chucks according to DIN ISO 15488 or EP 1 291 103 or roller jaw chucks according to DE 35 172 46.

Clamping chucks of the above-described type have proven valuable in practice.

However, there is still the problem already reported by German patent DE 199 26 209 that with a hard clamping of the shank, during operation, stresses in the form of a circumferential bending stress can occur (the above-mentioned patent refers to these stresses as a "walking effect"), which can sometimes result in a fatigue fracture of the tool shank.

In order to solve this problem the above-mentioned patent proposes providing damping cavities in the tool receptacle sleeve part that constitutes the actual clamping chuck. These damping cavities, embodied in the form of hollows, are sunk into the sleeve part from its end surface. However, it is only possible to achieve this with relatively complex production processes such as erosion.

As the above-cited patent correctly states, the damping cavities make the clamping of the tool shank "softer." As a result, the "cardan effects" that occur due to the otherwise hard clamping of the shank (as in DE 199 26 209) and that can lead to breakage of the tool shank are prevented or largely prevented—or to express it in other words: by permitting the tool shank to diagonally tilt by a small amount in the tool receptacle, which is no longer quite so rigid, the circumferential bending stress that this tool shank experiences, particularly during circumferential milling, decreases in comparison to the bending stress that occurs with a rigid clamping of the tool shank.

There are a few disadvantages, however, to the sinking of the damping cavities into the sleeve part as proposed by the above-mentioned patent DE 199 26 209. The production of the damping cavities in the sleeve part incurs some manufacturing costs. In addition, it is not possible to produce a limitless variety of geometries for the damping cavities in the sleeve part; on the contrary, there is only a limited range from which to select. Due to the minimal number of embodiment options, it is difficult to precisely achieve the desired damping characteristics using the damping cavities proposed by DE 199 26 209.

Furthermore, the damping characteristics of a tool holder can no longer be changed once the damping cavities have been sunk into its sleeve part.

By contrast, one object of the invention is to disclose a tool holder whose damping characteristics can be more freely selected while being simpler to produce.

SUMMARY OF THE INVENTION

According to at least one embodiment of the invention, at least one of the bearing surfaces of the sleeve (i.e. the outer and/or inner circumferential surface of the sleeve with which the sleeve rests in a supporting fashion against the sleeve part of the tool holder and against the tool shank) is interrupted by open recesses. Between the sleeve and the sleeve part of the tool holder and also between the sleeve and the tool shank, these open recesses form cavities that provide a damping action, i.e. cavities that reduce the "cardan effect" cited in DE 199 26 209 by more than just a negligible amount. The term "open recesses" here is understood to be effect-oriented—it also includes those designs in which the individual open recesses are to be connected to one another by means of conduits or other slots so that strictly speaking, they constitute a single open recess with a plurality of open recess sections. The same applies to the term "cavities."

Because it is to be machined separately from the clamping chuck, the sleeve according to the invention can be provided with the required open recesses in a very efficient way. The tool holders according to the invention can be efficiently manufactured because the tool holders as such can be produced in a standard embodiment, without having to take into account the subsequent damping cavities. This is because the tool holders are provided with their damping cavities only after they are subsequently equipped with the damping sleeve into which the damping cavities are sunk. If the sleeve is fastened in a respective tool holder in such a way that it can also be subsequently detached, then it is possible to adapt the damping characteristics of each tool holder to the current tool to be clamped.

Furthermore, the replaceability of the sleeves makes it possible to easily recondition a tool holder that has been damaged in the region of the sleeve—even if only due to a fatigue fracture in the region of the sleeve, which can never be entirely avoided with an elastic element.

An entirely essential advantage of the invention is the fact that such a sleeve makes it simultaneously possible to add open recesses from both the inside and the outside. It is precisely these open recesses, which, in their interplay, transform the sleeve into an elastic element whose damping properties can be freely selected from a wider range.

This enables a favorable adjustability of the desired damping properties. The weakening effect that the open recesses on the inner and outer circumference of the sleeve exert on the bearing surfaces can be numerically predicted with a high degree of precision. Selectively changing the size, position, and overlap of the individual open recesses offers a multitude of variation possibilities. It is then easily possible to inexpensively produce the sleeve so that the desired damping property is achieved because both the inner circumference and outer circumference of the sleeve are easily accessible to machining.

It is particularly advantageous if the sleeve, which is provided with open recesses on both the inner and outer circumference, is replaceably mounted in the tool holder. This is because the sleeve embodiment according to the invention allows the damping properties to be selected in fine gradations, enabling a systematic approach to the problem of damping and making it possible to offer a set of widely varying sleeves. The sleeve that achieves precisely the damping required in the specific individual case—depending on machining parameters, the tool, and the material to be machined—is selected from this array of different sleeves and inserted into the tool holder (ideally by being shrink-fitted to the tool shank).

Preferably, the open recesses on the sleeve are distributed asymmetrically in the circumference direction and/or are embodied with different geometries, namely so as to reduce the tendency of the sleeve to excite vibrations. This is because the cavities formed by the open recesses do not produce regular, uniform impulses that could excite vibrations.

As provided in a preferred embodiment, the open recesses are offset from one another in alternating fashion so that viewed in the circumference direction, open recesses that weaken the bearing surface on the inner circumference of the sleeve are situated next to and on both sides of the open recesses that weaken the bearing surface on the outer circumference, and vice versa.

A sleeve conceived in this way enables a design that is embodied as flexible over practically the entire circumference, but which nevertheless fits snugly with its outer circumference against a large contact surface of the fitting surface of the clamping chuck and fits snugly with its inner surface against a large contact surface of the tool shank—without having to sink intrinsically closed and therefore correspondingly difficult-to-machine damping cavities (like the damping cavities known from DE 199 26 209) into the sleeve in order to provide a sufficiently large contact surface.

Essentially for patenting reasons, it should be emphasized that in addition to the above-described open recesses embodied according to the invention, there could naturally also be individual damping cavities like the ones described in DE 199 26 209, even if for reasons of efficient manufacturing, it would be preferable not to provide such damping cavities. However, if additional cavities of this kind are to be provided nevertheless, then these cavities are preferably distributed asymmetrically or are embodied with different geometries so as to further reduce the vibration tendency.

Preferably, the open recesses on the outer circumference of the sleeve and the open recesses on the inner circumference of the sleeve are embodied as overlapping in such a way that the section of the sleeve constituting the overlapping region is situated neither directly against the sleeve part of the tool holder nor directly against the tool shank. The lack of direct contact gives such a section an elastic behavior in the radial direction. If it is embodied with sufficiently thin walls, the flexibility of such a section can therefore make a significant contribution to the desired damping action. Furthermore, it stands to reason that through the dimensioning of these sections (parameters: length of the section in the circumference direction, wall thickness of the section in the radial direction, and geometry and curvature of the section), it is very easy to predetermine the damping characteristics of the sleeve and to integrate them into the sleeve in the course of its manufacture.

According to another preferred embodiment, an open recess on the outer circumference of the sleeve overlaps with an open recess on the inner circumference of the sleeve in the circumference direction. That is, in this embodiment, the two open recesses mentioned here are largely situated next to each other in the circumference direction. They overlap in only a narrow region in the radial direction, i.e. they are situated one above the other only along a narrow region. By varying the width of this overlapping region, it is possible—as already discussed above—to simply and effectively carry out a dimensioning for the specific application.

According to a likewise preferred embodiment, viewed in the longitudinal direction, an open recess on the outer circumference of the sleeve overlaps with an open recess on the inner circumference of the sleeve. That is, in this embodiment, the open recesses are situated essentially or at least to a large degree one above the other in the radial direction. This further increases the freedom in the specific dimensioning of the sleeve.

In a particularly ingenious variant, an open recess on the outer circumference of the sleeve, which has a depth that decreases in the longitudinal direction, overlaps with an open recess on the inner circumference of the sleeve, which has a depth that increases in the same longitudinal direction. The sleeve is therefore largely comprised of areas whose surfaces are inclined relative to the rotation axis of the tool holder. These areas give the sleeve a particularly advantageous damping behavior.

Another weakness of the damping cavities known from DE 199 262 09 lies in the fact that these damping cavities permit a very soft flexing when momentarily subjected to very powerful forces. From time to time, the known damping cavities demonstrate a damping effect that is too pronounced because it results in a decrease in the production accuracy that can be achieved with the tool clamped therein.

Therefore another object of the present invention is to disclose a tool holder that has damping properties, but whose clamping of the tool shank is only able to flex by a predetermined amount.

The crucial point in this particular embodiment is that in this tool holder, the bearing surfaces of the sleeve are interrupted only by open micro-recesses. These open micro-recesses are open recesses with a small depth in the radial direction of the sleeve. These open micro-recesses constitute local spring elements, which, due to their small depth, experience solid compression, i.e. no longer flex to any appreciable degree, after a definite short spring travel.

In terms of their geometry and placement relative to one another, these open micro-recesses are preferably embodied as described in detail above, but they are embodied with only a very small depth in the radial direction, ideally a depth of 0.01 mm to 0.2 mm. In individual cases, it is even sufficient to provide a depth of less than 0.01 mm. At the same time, their geometry and placement are selected so that when they are subjected to a deformation that exceeds the maximum predetermined deformation or when the original bearing surface is flattened by more than a certain amount, the affected open micro-recess experiences solid compression and then becomes an additional bearing surface. This enlarges the bearing surface that was originally present, as a result of which the sleeve becomes significantly more rigid and stops further deformation from occurring. This effect primarily occurs when the sleeve is embodied with thin walls, i.e. with a wall thickness of approximately 1 mm or less, for example.

Other advantages, possible embodiments, and functions ensue from the following exemplary embodiments described below with reference to the figures, whose graphic disclosure content is wholly essential to the invention.

DETAILED DESCRIPTION OF THE PREFERRED EMBODIMENTS

Figure 1:
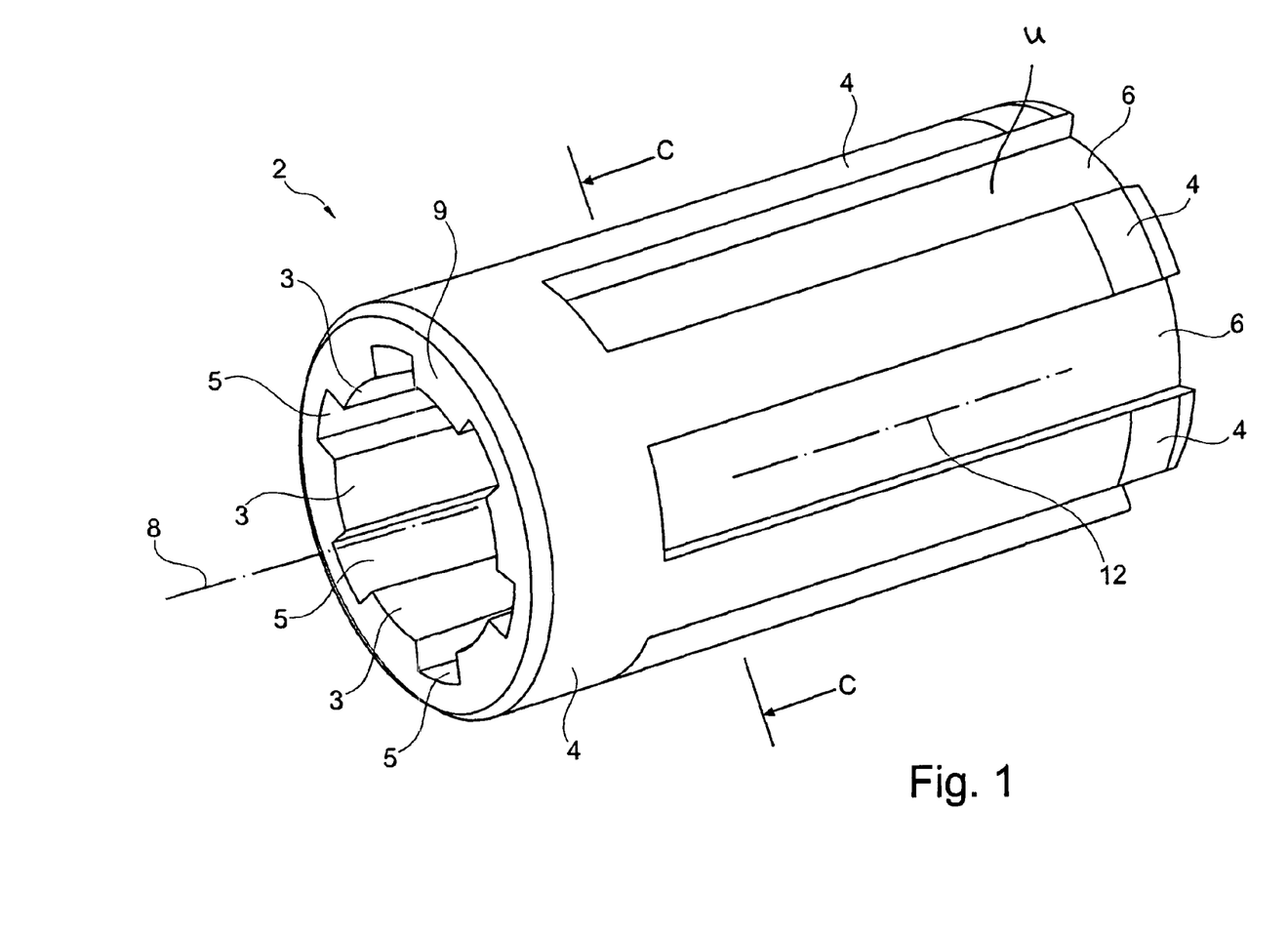
FIG. 1 is a perspective view of a first exemplary embodiment of the sleeve according to the invention.

The sleeve 2 shown in FIG. 1, which is generally composed of tool steel, is provided on its inner and outer circumference with bearing surfaces 3 and 4 whose diameter is selected and precisely machined so that the required fit to the counterpart surfaces is achieved, i.e. the bearing surface 4 on the outside rests properly against the inner circumference of the sleeve part of the tool holder and the bearing surface 3 on the inside rests properly against the tool shank to be clamped therein. The bearing surfaces 3, 4 of the sleeve are usually ground.

The bearing surface 4 is interrupted on the outer circumference by a number of external open recesses 6—distributed uniformly around the outer circumference in the case shown here, which are embodied in the form of grooves that are open toward the outside in the radial direction and in this case, have a rectangular outline, i.e. that are cut into the sleeve from the outside. These grooves each have a rectangular outline, i.e. an area that can be projected onto a rectangle. The bearing surface 3 of the inner circumference is interrupted by correspondingly embodied and positioned open recesses 5, but these grooves are cut in from the inside and are therefore open toward the inside in the radial direction. The open recesses 5 and 6 have no (or no appreciable) direct connection to one another, but instead are situated on completely opposite circumference sides of the sleeve from one another.

In the present instance, six open recesses 5, 6 are provided (around the circumference) on the inner and outer surfaces, respectively, dividing the respective bearing surfaces 3, 4 into six bearing surface sections, which are not labeled with separate reference numerals. In this embodiment, as before, the outer circumference of the sleeve 2 rests closely against the sleeve part of the tool holder while its inner circumference rests against the shank of the tool. The number of open recesses 5, 6 depends on the circumstances of the individual case and in particular on the diameter of the sleeve. It is practical to provide 4 to 10 such open recesses 5, 6.

The open recesses 6 on the outer circumference do not extend over the entire axial length of the sleeve, but only over a large part of it. In this way, in the vicinity of one of its end surfaces 9, the sleeve has a bearing surface section that is closed in the circumference direction like a ring.

Figure 3:
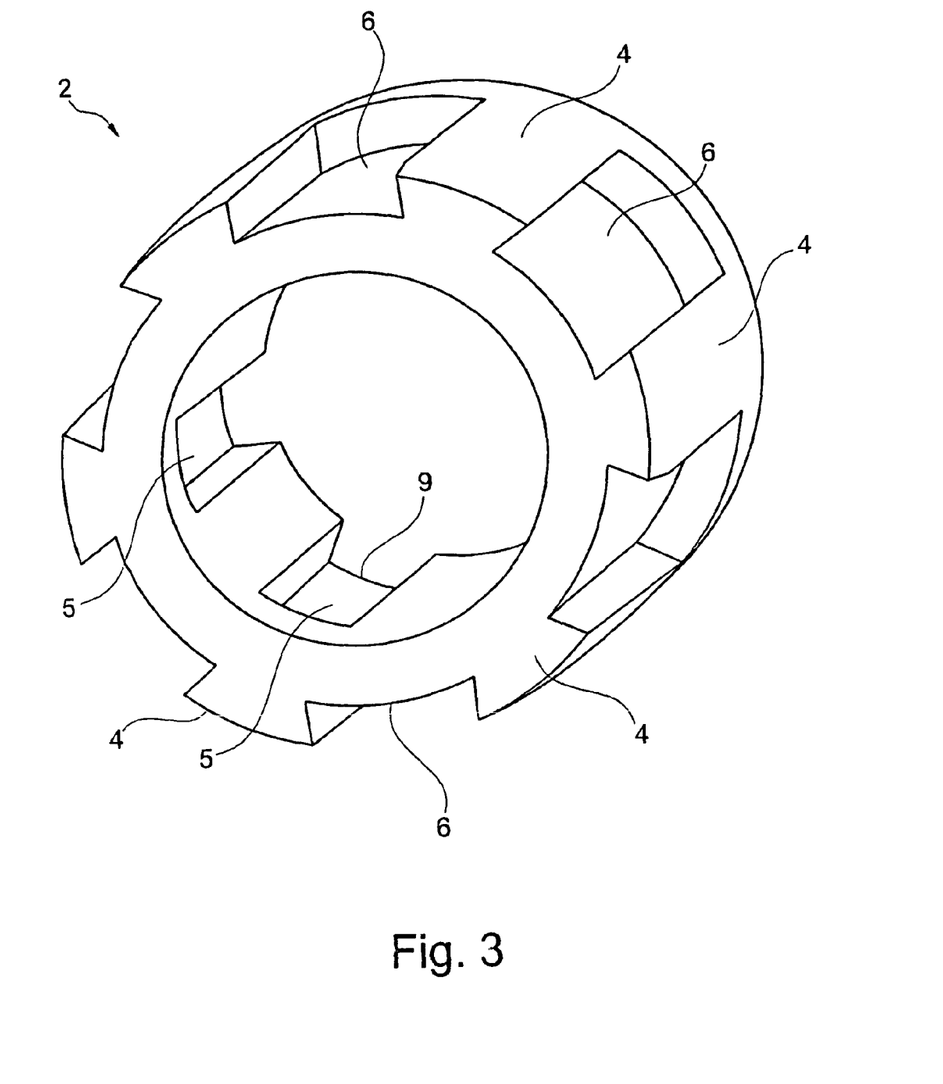
FIG. 3 is a detail view of the first exemplary embodiment shown in FIGS. 1 and 2.

Optionally, the open recesses 5 on the inner circumference of the sleeve 2 do not extend over the entire axial length of the sleeve, but instead end a certain distance apart from the end surface 9, for example as shown in FIG. 3. Such an embodiment is particularly advantageous in cases in which the sleeves are to be used for clamping tools that are cooled internally by means of coolant supplied along their shanks. This is because the sections embodied in the form of a ring, which is closed in the circumference direction, prevent the open recesses 5, 6 from forming continuous conduits along which the coolant pushes outward from the interior of the tool holder.

To clarify, it should be noted that the open recesses 5, 6 can also be embodied in the form of continuous conduits so that the tool can be supplied with coolant from the outside, if so desired.

Figure 2:
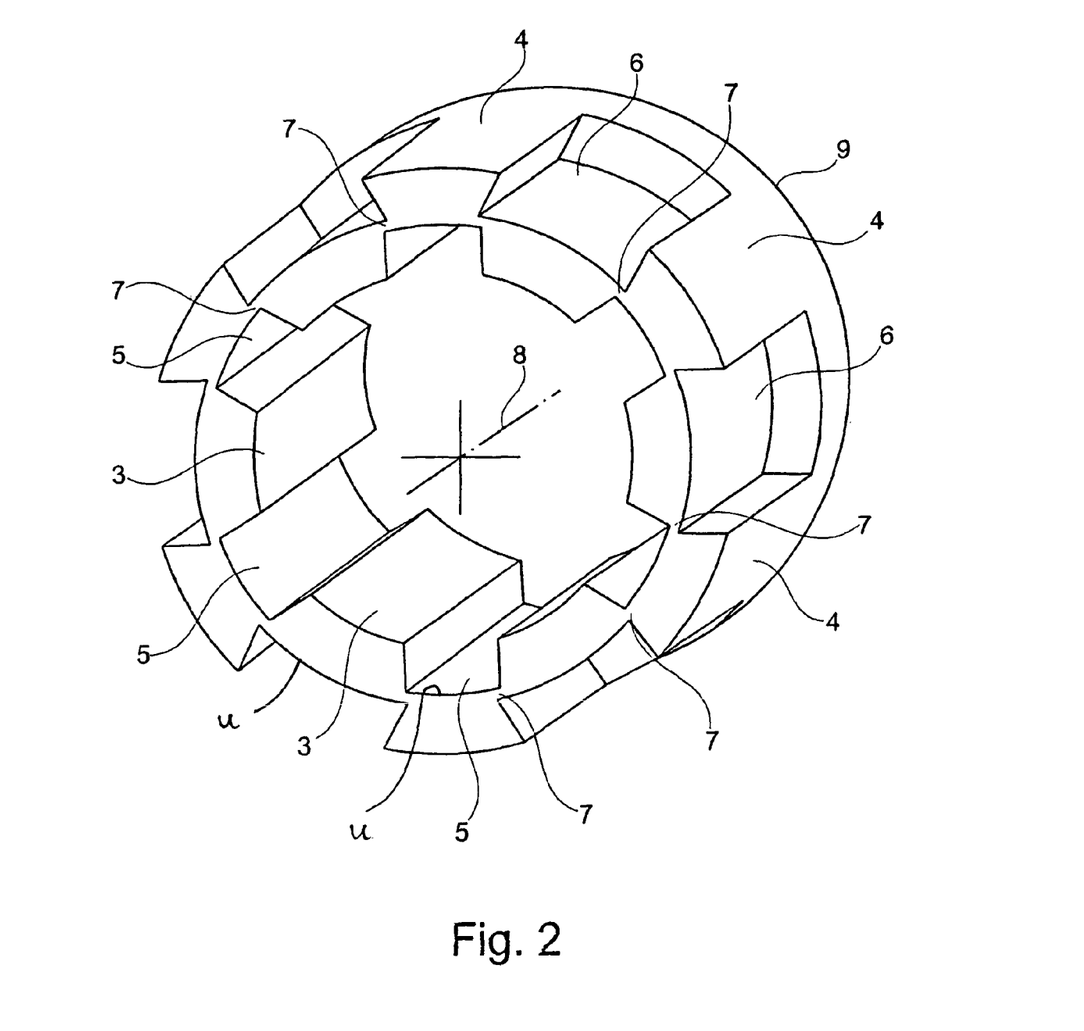
FIG. 2 is a sectional view along the line C-C through the sleeve shown in FIG. 1.

As is clear from FIG. 2, the open recesses 5 and 6 are offset from one another in alternating fashion so that (viewed in the circumference direction) open recesses 5 that weaken the bearing surface 3 on the inner circumference of the sleeve are situated next to and on both sides of open recesses 6 that weaken the bearing surface 4 on the outer circumference—and vice versa. As a result, the open recesses 5, 6 on the inner and outer circumference of the sleeve overlap only partially, namely in the region of their lateral edges extending parallel to the rotation axis. This overlapping is only slight. It does, however, produce a section 7 constituting an overlapping region that is situated neither directly against the sleeve part of the tool holder nor directly against the tool shank. In view of this, it stands to reason that the sleeve is very flexible in the region of the section 7, depending on how far the section 7 extends in the circumference direction between the inner and outer open recesses 5, 6.

Figure 4:
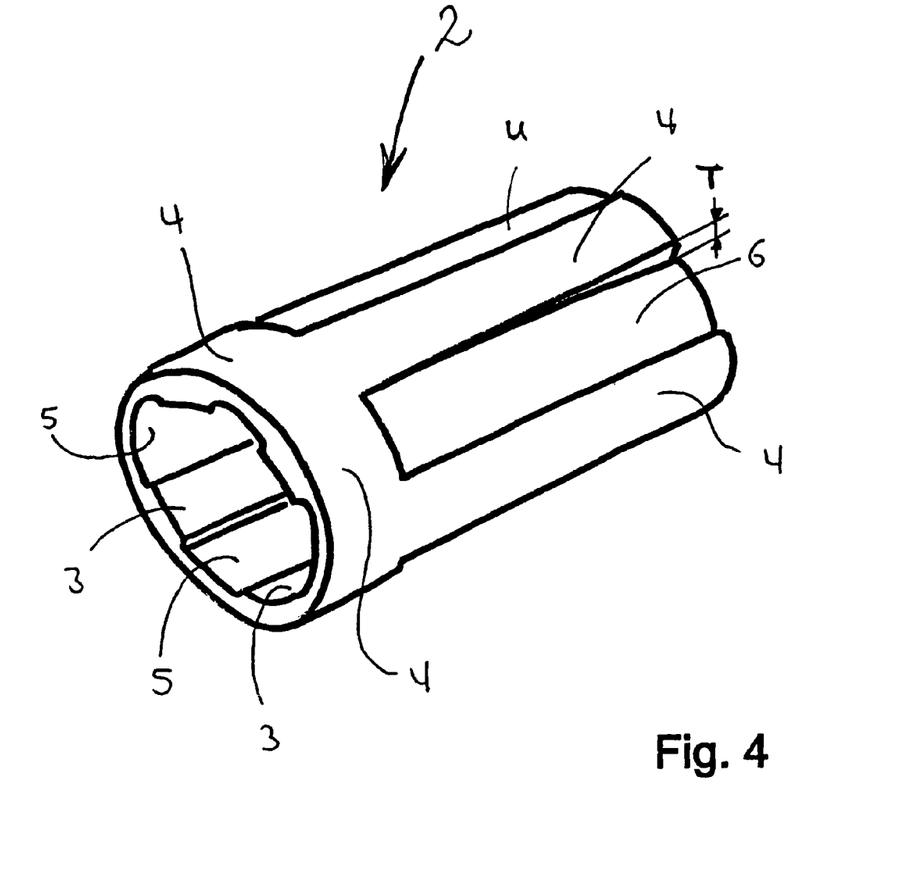
FIG. 4 is a perspective view of a second exemplary embodiment of the sleeve according to the invention in which the depth of the open recesses increases and/or decreases in the axial direction.

FIG. 4 shows a second exemplary embodiment of the invention. In this exemplary embodiment, the depth T of at least a part of the open recesses (in this case all of the open recesses 6) changes in the axial direction. In this way, it is possible to selectively vary the flexibility and damping properties of the sleeve in the axial direction, e.g. so that the sleeve is somewhat "harder" toward the tool holder end of the tool shank.

Figure 5:
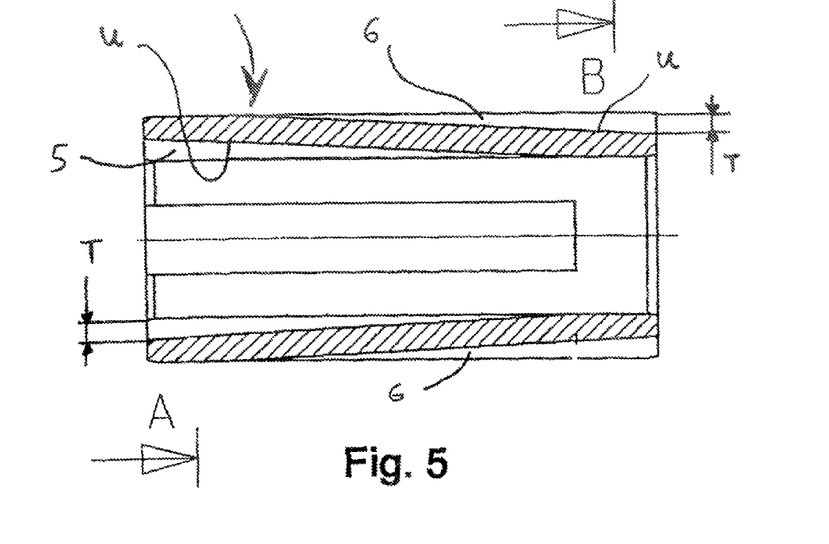
FIG. 5 shows a third exemplary embodiment of the sleeve according to the invention, here in a sectional view extending along the rotation axis.

FIG. 5 shows a third exemplary embodiment of the invention. By contrast with the first and second exemplary embodiments, the open recesses 5, 6 on the inside and outside in this case do not overlap only in the region of their lateral edges parallel to the rotation axis. Instead, an open recess 5 on the inside and a respective open recess 6 on the outside are situated one above the other in the radial direction so that they overlap each other completely or almost completely. The one open recess 5 has a depth T that steadily decreases in the direction of the longitudinal axis while the other open recess 6 has a depth T that steadily increases in the same direction.

Figure 6:
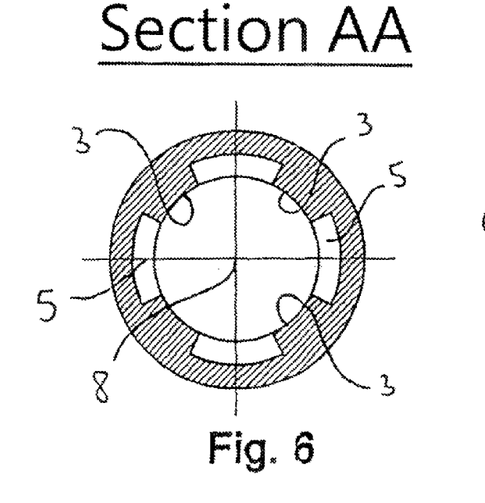
FIG. 6 shows a section through the sleeve shown in FIG. 5, along the cutting line labeled with the letter A.
Figure 7:
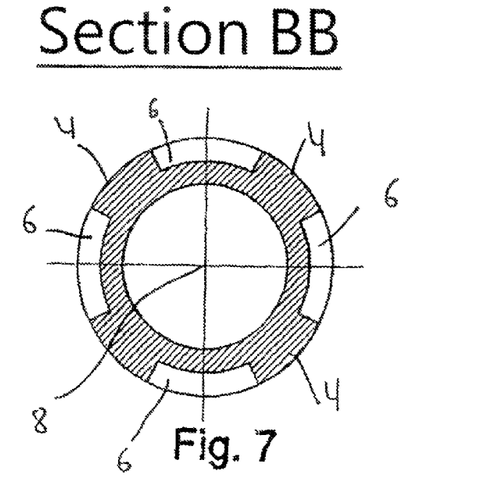
FIG. 7 shows a section through the sleeve shown in FIG. 5, along the cutting line labeled with the letter B.

Further details are shown in FIGS. 6 and 7, each of which depicts a sectional view, one along line A and the other along line B.

This embodiment also serves to optimally adapt the flexibility of the sleeve and its damping properties in the axial direction to the requirements at hand—taking into account the fact that when influenced by the radial forces occurring at the cutting portions of the tool, the clamped section of the tool shank has the tendency to "tilt" around a point situated—very roughly speaking—approximately in the middle of the sleeve between its left and right end surface.

Figure 8:
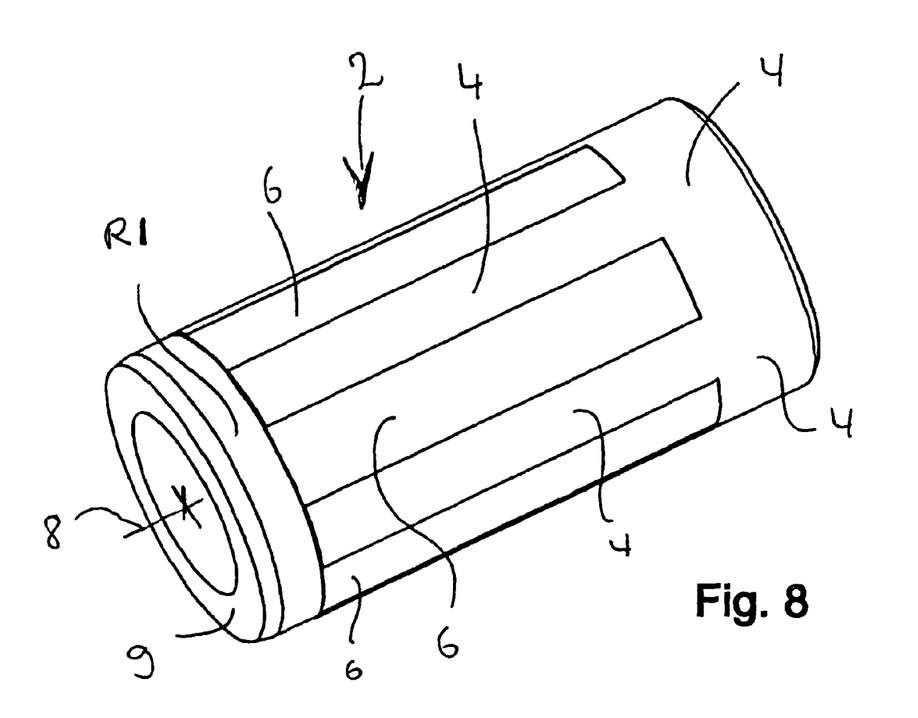
FIG. 8 is a perspective view of a sleeve according to a fourth exemplary embodiment.

Finally, FIG. 8 shows a fourth exemplary embodiment. With regard to their geometry and positioning, the open recesses 5, 6 of this exemplary embodiment are in principle comparable to the open recesses 5, 6 of the first exemplary embodiment provided with the same reference numerals. In other words, the open recesses 5, 6 in the present case are likewise constituted by grooves with a rectangular outline. However, the depth T of these open recesses in the radial direction is only a fraction of the depth T of the open recesses in the first exemplary embodiment. This is particularly visible in FIG. 12—the radius of the open recess here is for example only approximately 0.05 mm smaller than the radius RT of the bearing surface. This applies to both the inside and the outside of the sleeve.

This slight diameter difference, in other words the small depth T of the open recesses 5, 6 here, achieves the effect essential to the invention.

Figure 12:
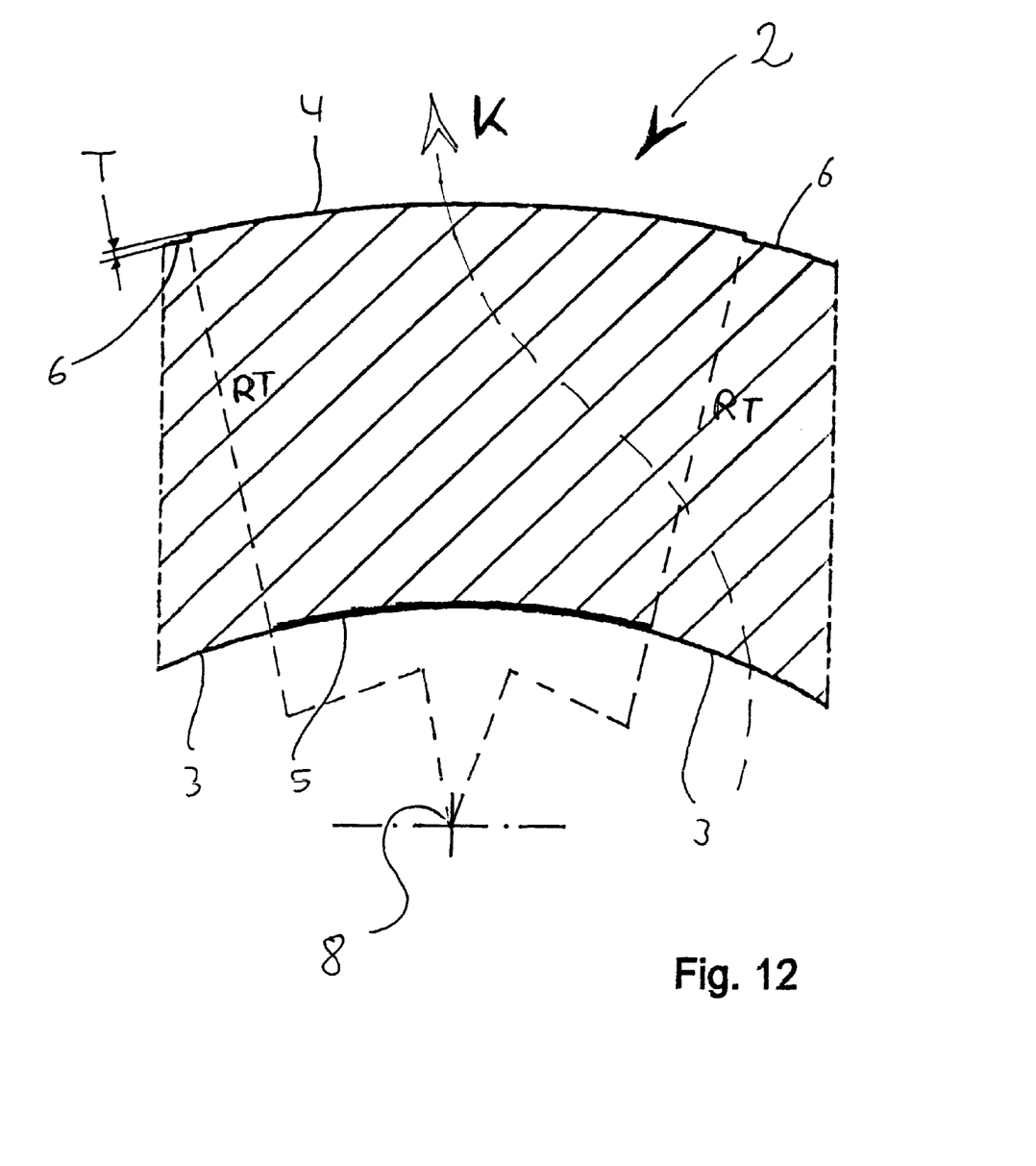
FIG. 12 shows a detail of the wall of a sleeve equipped with open micro-recesses according to the fourth or fifth exemplary embodiment.

This can be explained quite simply in conjunction with FIG. 12. The shank of the clamped tool, not shown here, rests against the bearing surfaces 3 on the inner circumference of the sleeve. The forces issuing from the tool shank, which are to be transmitted via the spindle of the power tool, extend at an angle (symbolically indicated by the arrow K) via the wall of the sleeve and are conveyed via the outer bearing surface 4 from the sleeve to the sleeve part of the tool holder, not shown here. With correct dimensioning according to the invention, when subjected to stress in the radial direction, the bearing surfaces 3, 4 properly flex a short distance at first. Once this has occurred, the elastic flattening or elastic deformation becomes great enough that then, at least some regions of the adjacent open recesses 5, 6—but more than only an insignificant amount thereof—also come into contact with the tool shank and the sleeve part of the tool holder. As a result, the sleeve 2 suddenly behaves in an extremely rigid fashion, thus preventing an impermissibly large deformation.

Figure 9:
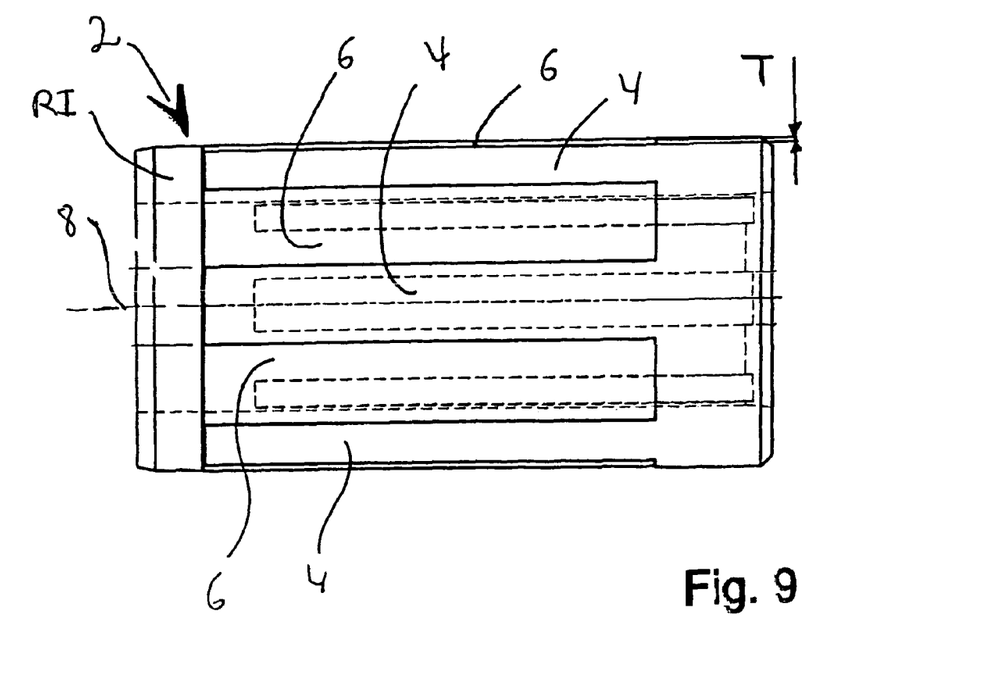
FIG. 9 is a side view of the sleeve shown in FIG. 8; the open recesses that are not visible here are depicted with dashed lines.
Figure 10:
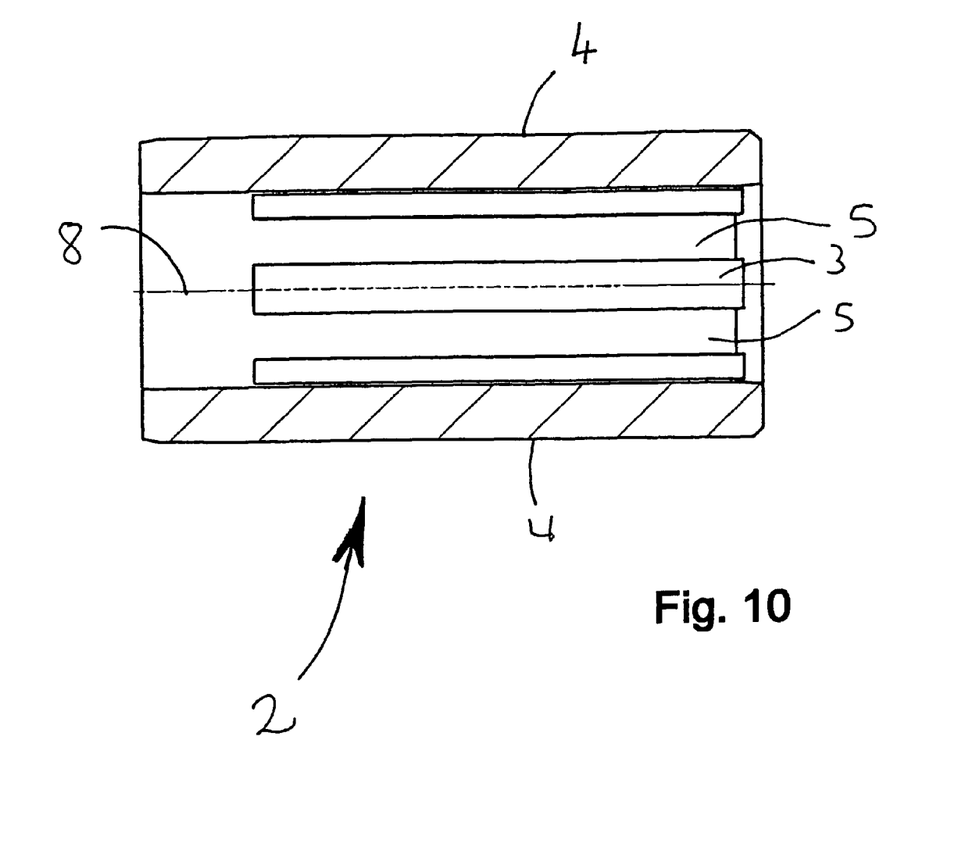
FIG. 10 shows a section through the sleeve shown in FIG. 8, along the rotation axis.

As is particularly clear from FIGS. 8 through 10, the open recesses 5, 6 in this exemplary embodiment do not extend into the region of the end surface 9 of the sleeve 2 at either of the ends, but instead come to an end before reaching them. As a result, the outer circumference of the sleeve 2 has a section at both ends whose surface constitutes a closed ring in the circumference direction. While one of these two rings (on the right in FIG. 8) remains a component of the bearing surface 4, the other of the two rings, labeled RI here, is embodied with a smaller outer diameter, i.e. is not a component of the fit that clamps the tool shank in place. This ring RI facilitates proper insertion of the sleeve 2 into the tool receiving opening of the sleeve part of the tool holder.

Figure 11:
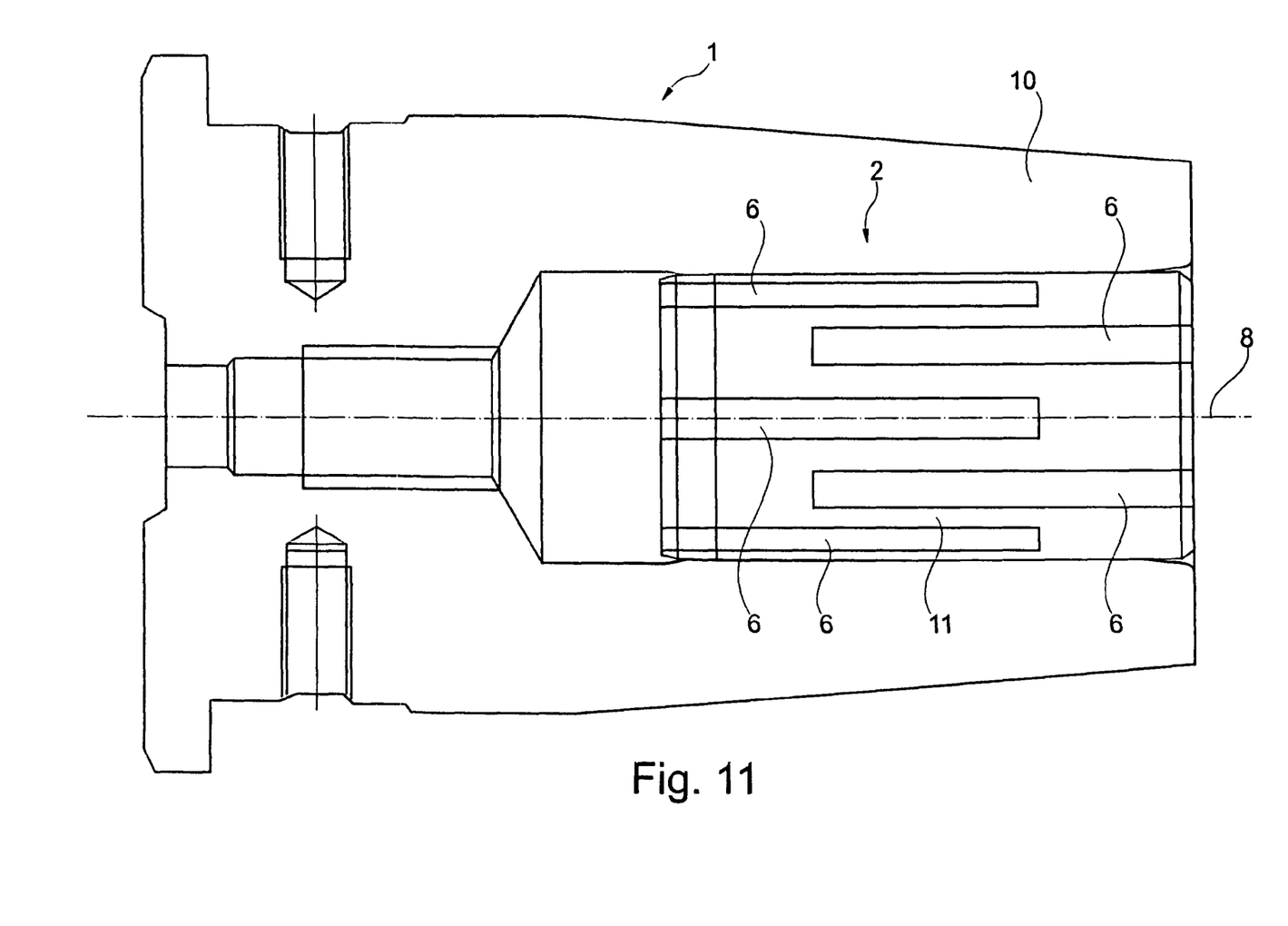
FIG. 11 shows a sleeve according to a fifth exemplary embodiment of the invention, installed into the tool holder, which in this case is embodied in the form of a shrink-fit chuck.

Finally, FIG. 11 shows a last exemplary embodiment of the sleeve 2 according to the invention and the tool holder 1 according to the invention. The sleeve 2 here is inserted into a tool holder 1 whose clamping chuck is embodied in the form of a shrink-fit chuck. As shown here, the tool holder has a sleeve part 10 with a tool receiving opening 11 into which the tool, likewise not shown here, is inserted with the interposition of the sleeve 2.

This sleeve is also provided with open micro-recesses 6 that once again have a depth of 0.05 mm and therefore produce the effect described above. The open recesses 6 here, however, are situated along the outer surface in an offset fashion so that only part of the open recesses 6 situated one after another in the circumference direction are actually situated directly adjacent to one another.

This produces a sleeve 2 whose damping action is particularly pronounced in its middle region (viewed in the axial direction).

Depending on how powerful the damping action of this sleeve 2 should be, depending on the thickness of the sleeve walls, and depending on the material of which it is composed, it is possible to provide only the open recesses 6 on the outer circumference of the sleeve 2 or to also provide additional open recesses on the inner circumference of the sleeve (the latter embodiment is not shown here).

For the sake of completeness, it should also be noted that in the sleeves 2 according to the fourth and fifth exemplary embodiments, it is even possible to completely eliminate the open micro-recesses 5, 6 if these sleeves are produced from a suitable material with sufficient damping action. For example, copper alloys, lead alloys, or bronze have turned out to be suitable damping materials.

As mentioned above, in embodiments that are comparable to the first through third exemplary embodiments, the open recesses 5, 6 can also be embodied in the form of continuous conduits so that during operation, the tool can be supplied with coolant from the outside. In this case, it is advantageous to embody the conduits in a special way, namely so that despite the rotation of the tool, the greatest possible portion of the coolant travels along the tool to its cooling-targeted cutting portions instead of being hurled outward prematurely.

For this purpose, it is suitable to embody the circumference surface delimiting the groove in the sleeve as inclined relative to the rotation axis of the sleeve so that the coolant traveling along this circumference surface has a tendency, upon exiting the groove, to flow toward the tool shank. Even with this method, it is naturally impossible to completely prevent coolant that has flowed past the tool shank from being subsequently hurled outward, but it does reduce the amount of "lost" coolant.

In the case of a groove that is sunk into the outer circumference of the sleeve, the circumference surface delimiting the groove in the sleeve is the surface that constitutes the groove bottom delimiting the groove in the radially inward direction. FIG. 4 shows an image of how the inclination mentioned here can appear—even though FIG. 4 shows an embodiment in which the groove 6 is not continuous and therefore is not suitable for conveying coolant. In the case of a groove that is sunk into the inner circumference of the sleeve, the circumference surface delimiting the groove in the sleeve is the surface that constitutes the groove bottom delimiting the groove in the radially outward direction. The above explanation applies here analogously—such a groove has its greatest depth where the coolant exits the sleeve.

Another advantageous measure lies in embodying the groove so that at the end of the groove, the coolant flows out approximately tangentially, in the opposite direction from the rotation. As a result, the absolute speed of the exiting coolant is reduced relative to the imaginary (spatially fixed) rotation axis of the sleeve and tool shank so that in addition, the exiting coolant is subjected to only reduced centrifugal forces, i.e. has only a reduced tendency to be hurled outward prematurely. Ideally, the coolant flows out with a relative speed that essentially corresponds to the circumferential speed so that in the region of its exit from the sleeve, the coolant initially stands still in absolute terms. This measure will be explained below in connection with the example of an external groove, but applies equally to internal grooves.

Figure 13:
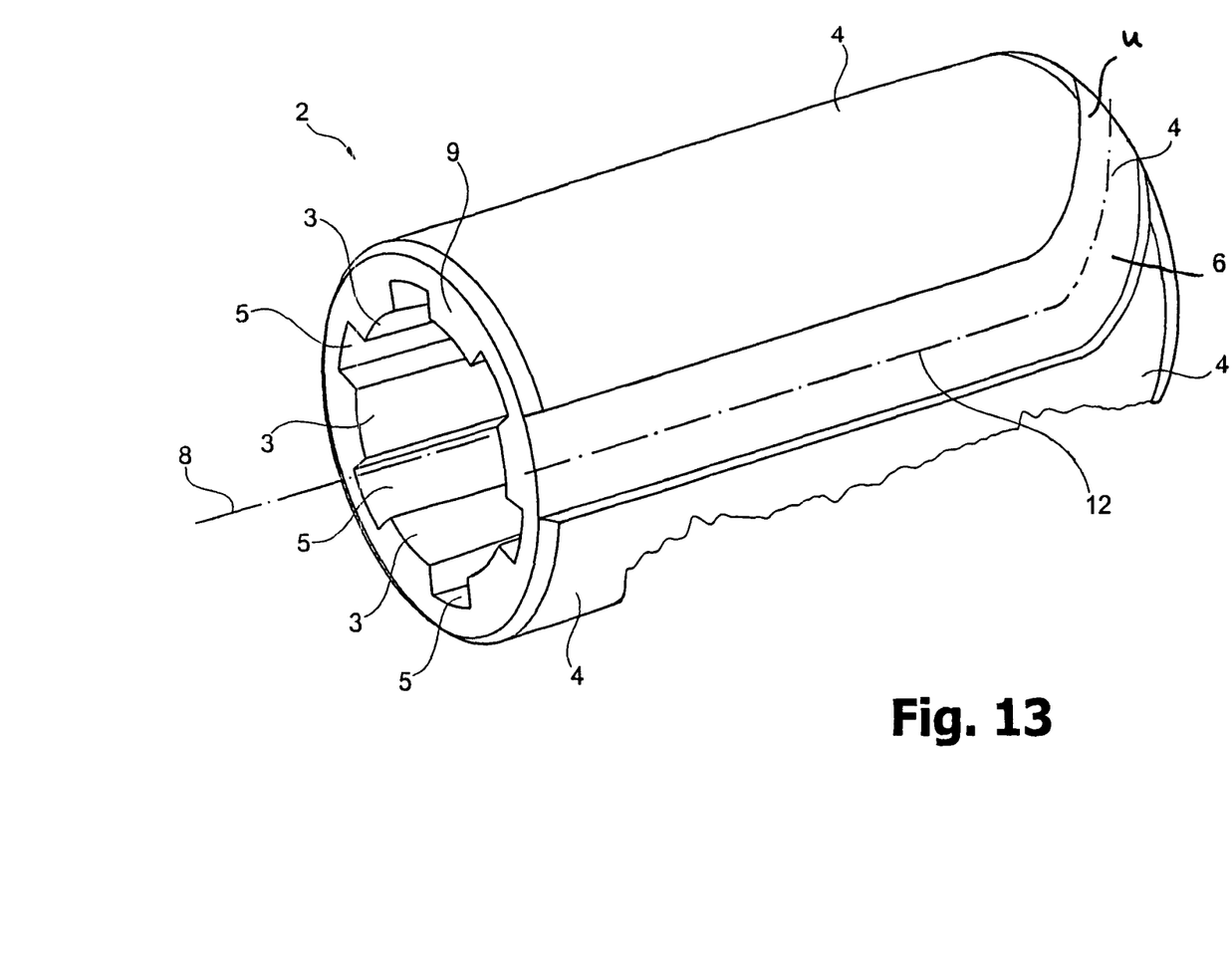
FIG. 13 shows, for example in conjunction with a single depicted groove, an illustration of a variant in which the grooves provide not only a damping, but also simultaneously fulfill a coolant conveying function (baffles before the coolant exit).

An example for such a groove is shown in FIG. 13. It should be noted that FIG. 13 is only an exemplary depiction and therefore shows only a single groove 6 although as a general rule, the sleeve 2 is provided with a plurality of such grooves in its outer circumference (usually situated at regular intervals). In this case, in the region before the exit of the coolant, the groove 6 is provided with a kind of "baffle," i.e. embodied so that the coolant is deflected and thus is given a kind of "spin" that allows the coolant to exit with a not insignificant velocity component in the tangential direction, in the opposite direction from the rotation of the sleeve 2, which in this case generally rotates clockwise (clockwise rotation during normal operation, this is analogously reversed for special tools that rotate counterclockwise by default).

In even more technically elaborate embodiments, the groove 6—by contrast with what is depicted in FIG. 13—is not provided with one or more right-angled baffles in the exit region, but is instead embodied in twisting fashion at least in the end region, i.e. has a helical curvature (with a "left-handed thread") at least in the end region.

In some cases, an even further improved conveying action of the grooves is achieved if both of the above-mentioned conveying measures are combined, i.e. the groove is embodied for example in twisting fashion (with a counterclockwise twist) and at the same time, the circumference surface delimiting the groove in the sleeve is embodied as inclined (not shown). In the case of a groove embodiment of the type shown in FIG. 13, it would be suitable, at least in the end section of the groove situated after the baffle, for a circumference surface that delimits the groove in the sleeve to be embodied as inclined (i.e. with a groove bottom similar to the one shown in FIG. 4).

It should also be noted in relation to FIG. 13 that the baffle is optimally situated in a region in which the sleeve has an at least minimally reduced diameter that no longer (or no longer completely) contributes to the press fit that secures the tool because then, the baffle does not appreciably hinder the desired damping action.

The above-explained measures for conveying/influencing the direction of the coolant are also useful in and of themselves, independent of the damping function of the sleeve, which is why separate protection is also claimed for them.

It should further be noted that it is also advantageous for only particular grooves—or possibly also only a single groove out of several of them—to be provided with the above-explained measures for conveying/influencing the direction of the coolant. Usually in this case, only these particular grooves or this particular groove is/are embodied as continuous and used to act on the tool shank with coolant, while the other grooves only perform the function of ensuring the desired damping properties. This achieves a certain degree of decoupling.

The invention claimed is:

1. A tool holder, comprising:
a tool receptacle for frictionally clamping a tool shank; and
a sleeve situated between the tool shank and a clamping surface of the tool holder, with the tool holder applying pressure on the tool shank via the sleeve and thus producing a frictional engagement;
wherein at least one bearing surface of the sleeve is interrupted by open micro-recesses that constitute a spring element, which experiences solid compression after a definite short spring travel, wherein the depth of the open micro-recesses is less than or equal to 0.1 mm, and wherein the open micro-recesses are interrupted in a circumferential direction by non-recessed areas.

2. The tool holder as recited in claim 1, wherein the sleeve is embodied with a wall thickness of 1 mm or less.

3. A tool holding system composed of a tool holder and a set of a plurality of sleeves provided for use in the tool holder, embodied in accordance with the tool holder of claim 1.

4. The tool holder as recited in claim 1, wherein a bearing surface on an outer circumference of the sleeve is interrupted by first open micro-recesses and a bearing surface on an inner circumference of the sleeve is interrupted by second open micro-recesses and the first and second open micro-recesses combine to form a damping cavity.

5. The tool holder as recited in claim 1, wherein the open micro-recesses are distributed asymmetrically in the circumferential direction and/or are embodied with different geometries.

6. The tool holder as recited in claim 1, wherein the open micro-recesses have an elongated, rectangular outline whose imaginary main axis extends at least essentially parallel to a rotation axis of the tool holder.

7. The tool holder as recited in claim 1, wherein the open micro-recesses are offset from one another in alternating fashion so that viewed in the circumferential direction, open micro-recesses that weaken the bearing surface on an inner circumference of the sleeve are situated essentially next to and on both sides of the open micro-recesses that weaken the bearing surface on an outer circumference, and vice versa.

8. The tool holder as recited in claim 1, wherein the open micro-recesses on an outer circumference of the sleeve and the open micro-recesses on an inner circumference of the sleeve are embodied as overlapping so that a section of the sleeve constituting an overlapping region is situated neither directly against the sleeve part of the tool holder nor directly against the tool shank.

9. The tool holder as recited in claim 8, wherein the overlapping region is embodied in such a way that an open micro-recess on the outer circumference of the sleeve overlaps with an open micro-recess on the inner circumference of the sleeve in a circumferential direction.

10. The tool holder as recited in claim 8, wherein an open micro-recess on the outer circumference of the sleeve overlaps with an open micro-recess on the inner circumference of the sleeve in a longitudinal direction.

11. The tool holder as recited in claim 10, wherein an open micro-recess on the outer circumference of the sleeve, which has a depth (T) that decreases in the longitudinal direction, overlaps with an open micro-recess on the inner circumference of the sleeve, which has a depth (T) that increases in the same longitudinal direction.

12. The tool holder as recited in claim 1, wherein one and the same bearing surface is interrupted by open micro-recesses, which have regularly alternating increasing and decreasing depths viewed along a same longitudinal direction.

13. The tool holder as recited in claim 1, wherein the sleeve of the tool holder is provided with at least one groove, which is embodied in the form of a continuous conduit, so that during operation, it is possible to supply the tool with coolant via this groove and the circumference surface delimiting the groove in the sleeve is embodied as inclined relative to a rotation axis of the sleeve so that the coolant is deflected toward the tool shank upon exiting the groove.

14. The tool holder as recited in claim 13, wherein the groove has its greatest depth in the region in which the coolant exits.

15. The tool holder as recited in claim 1, wherein the sleeve of the tool holder is provided with at least one groove, which is embodied so that during operation, a coolant flows out the end of the groove at least with a movement component in the opposite direction from the rotation of the sleeve and flows out essentially in the opposite direction from the rotation direction.

16. The tool holder as recited in claim 15, wherein at least one groove is embodied so that in the region in which the coolant exits the sleeve, a spin is imparted to it in the opposite direction from the rotation of the sleeve.

17. The tool holder as recited in claim 15, wherein the embodiment of the groove and the infeed pressure of the coolant are matched to each other so that the coolant exits at a relative speed that essentially corresponds to the circumference speed of the sleeve, but is oriented in the opposite direction from the circumference speed.

* * * * *